Patented June 7, 1932

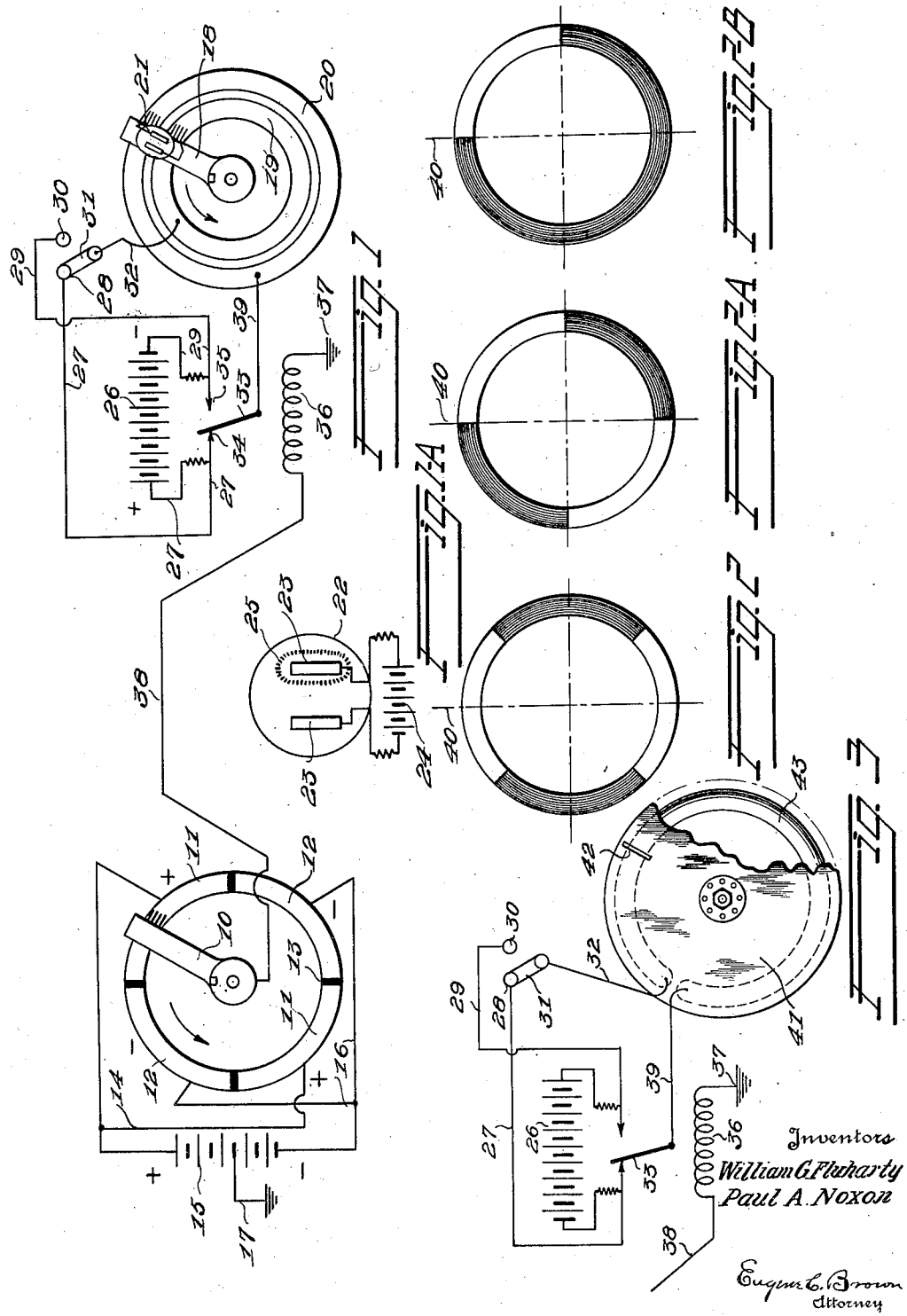

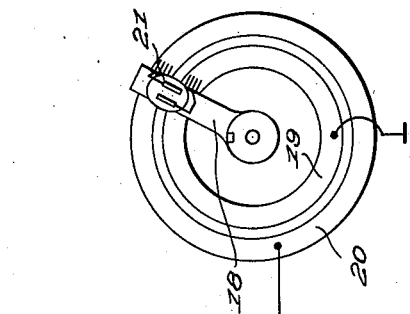

1,862,474

UNITED STATES PATENT OFFICE

WILLIAM G. FLUHARTY, OF ROCKVILLE CENTER, AND PAUL A. NOXON, OF JACKSON HEIGHTS, NEW YORK, ASSIGNORS TO THE WESTERN UNION TELEGRAPH COMPANY, OF NEW YORK, N. Y., A CORPORATION OF NEW YORK

SYNCHRONIZING AND PHASE INDICATING DEVICE

Application filed October 23, 1930. Serial No. 490,702.

This invention relates to a synchronization and phase comparison signaling device for indicating the synchronism or asynchronism of two rotating devices and for indicating also the phase relations of the two rotating devices, the signaling device being peculiarly adapted for use in a synchronous telegraph system.

In the operation of many electrical systems employing two rotating members it is desirable and even essential that any variation in the synchronism and phase relation of the two be detected so that adjustment may be made to restore synchronism and proper phase relation. Among the objects of the present invention are to provide a novel signaling device associated with two such members and arranged to afford visual indication of the synchronic relation of the members; to afford visual indication of the phase relation between the two; to afford visual indication of faults in or interruption to the circuit between such members; and to afford visual indication of the synchronic and phase relations between the two with relation to either the positive or negative half waves transmitted from one member to the other.

With the above and other objects in view the invention will now be described in detail in a plurality of embodiments and will then be particularly claimed, reference being had in the description to the accompanying drawings, wherein:—

Figure 1 is a diagram disclosing two rotating members and the signal as used in connection therewith.

Figure 1—A is a diagram showing one form of lamp as used herewith and as connected to a battery.

Figure 2 is a diagram illustrating the appearance of the signal when the two members are in synchronism but out of phase forty-five degrees.

Figure 2—A is a diagram showing the appearance of the signal when the two members are in synchronism and in phase.

Figure 2—B is a diagram showing the appearance of the signal when used to show only the incoming reversals at the signal provided member.

Figures 3, 4, 5 and 6 are partial diagrams of the system showing modifications of the invention.

In the form of the invention shown in Figure 1 a revolving member 10, in the form of a brush, traverses a commutator ring having positive segments 11 and negative segments 12, separated in the usual manner by insulation. Conductors 14 connect the positive segments in multiple to the positive terminal of a battery 15 and conductors 16 connect the negative segments to the negative terminal of said battery. A ground conductor 17 is connected to the neutral point of this battery. The other revolving member 18 is also shown as a brush. An inner conductor ring 19 and an outer conductor ring 20 are traversed by this brush. A lamp 21 is mounted on the brush so that its terminals are in conductive relation with the respective rings 19 and 20.

The lamp used with this form of the invention is what is known as a negative glow lamp and the construction and action of such a lamp is shown in the diagram in Fig. 1—A. As there shown a glass bulb is provided with spaced glower terminals 23. Within the bulb is a suitable gas such as neon, argon, helium or other gas having like properties when used in such a lamp. The gas used is, of course, under low pressure. A battery 24 is shown as connected to the terminals 23 and, as shown by the nimbus 25, the glower terminal connected to the negative terminal of the battery will, under these conditions, glow while the glower terminal connected to the positive terminal of the battery will remain dark. Reversing the connections to the battery will cause the left hand glower terminal to glow and the right hand glower terminal to be dark.

A battery 26 is shown in Figure 1 and corresponds to the battery 24 just described. A conductor 27 connects the positive terminal of the battery to a switch contact 28. A conductor 29 similarly connects the negative terminal of battery 26 with a second switch contact 30. A switch arm 31 is pivoted to selectively engage the contacts 28 and 30 and is connected by a conductor 32 with the ring 19. There is also provided a polarized relay having a contact arm 33 mounted to oscillate between a fixed positive contact 34 and a fixed negative contact 35 connected respectively to the conductors 27 and 29. A winding 36 controls the movement of the arm 33 and has one terminal grounded at 37. A conductor 38 connects the other terminal of the winding 36 with the brush 10. A conductor 39 connects the arm 33 with the ring 20.

Under the conditions shown with the switch arm 31 closed on contact 28 no current will pass through the lamp 21 so long as the brush 10 is on one of the positive segments 11 because, with the brush 10 thus positioned, a positive impulse will be sent over the conductor 38 to the coil 36 and the arm 33 will remain in contact with contact 34. Both rings 19 and 20 will thus be connected to the same terminal of the battery 26. Upon the brush 10 passing onto a negative segment 12 the polarity of the coil 36 will be reversed and the arm 33 will move into engagement with the contact 35. Then current will flow from the battery 26 through conductor 27, switch arm 31, conductor 32, ring 19, lamp 21, ring 20, conductor 39, arm 33, contact 35 and conductor 29 to the battery. The lamp will be thus caused to glow every time the brush 10 travels over a negative segment 12. If the switch arm 31 is shifted to engage contact 30, then the current will be reversed through the lamp and the lamp will glow every time the brush 10 traverses a positive contact 11. In this way either the negative half or the positive half of the alternating wave from the commutator ring is used to effect signaling. The normal appearance of the signal with the two rotating members in phase and in synchronism is, as shown in Figure 2—A, an alternation of light and dark arcs constant in position and the termination of the light arcs in coincidence with a reference line 40. When the brush 18 revolves faster than the brush 10 the image, as shown in Figure 2—A appears to rotate in the direction of rotation of the brushes, except at speed differences which are even multiples of each other. To illustrate let it be assumed that the brush 10 revolves at exactly half the speed of brush 18. Then the images will appear stationary. However, such even multiple differences are shown because the number of images will be halved, each being double the usual length. If the brush 10 rotates faster than brush 18 the image will appear to rotate in a direction opposite the rotation of the brushes. If the two brushes rotate in synchronism but out of phase the images will appear stationary but will be displaced, as shown for one case in Figure 2.

When it is desired to phase brush 18 with brush 10 with respect to the incoming reversals of current only, the conductors connected to the two segments 12 and the lower left hand segment 11 may be connected to an opposite potential than that to which segment 11 is connected. When this is done and the brushes are revolved in synchronism the lamp produces the effect shown in Figure 2—B, being lit only during the passage of the brush 10 over the chosen segment.

In the form of the invention shown in Figure 3 a disk 41 having a narrow slot 42 adjacent its periphery is used in place of the brush 18 and rings 19 and 20. An arcuate tubular lamp 43 is connected directly to the conductors 32 and 39, the lamp being arranged to be visible throughout its length through the slot 42. The lamp 43 is made to extend for a complete circle beneath the disc by making its ends overlap. When thus arranged, the signals given, due to persistency of vision, will have substantially the same appearance as in the previously described form.

Instead of the polar relay 36 shown in Figure 1 we may employ a neutral relay 36', biased against its back contact as shown in Figure 4.

On lines over which sufficient power or voltage may be transmitted, the relay and its battery 26 may be dispensed with when unipolarity impulses are transmitted, the line 38 being connected directly to one ring, as 20, and the other ring being grounded as shown in Figure 5.

The relay may also be omitted when alternating currents are transmitted over the line if one ring is connected to the line and the other ring is connected to a grounded battery 45 having a potential equal to that of the received signals, as indicated in Figure 6. When so connected, the lamp will glow when a polarity opposite to that of the grounded battery is received. The lamp will not glow when the received signal is the same in value and polarity as the grounded battery. Hence a pattern will be traced as before as the arm 18 is revolved.

The device may be used to indicate faults in signal transmission or defects in the operation of the apparatus. This ability to indicate faults is based upon the property of the lamp to extinguish instantaneously if its circuit is momentarily interrupted, these interruptions breaking the continuity of the pattern made by the revolving lamp. For instance, when a polar line relay is used for the reception of signals and a reversal of the line current occurs because of outside forces, the tongue will move away from its contact and cause a break in the pattern, likewise, bounce of the relay tongue will also be seen. When a neutral or single line relay is used, any interruption of the line current will cause the relay tongue to leave its contact and interrupt the pattern, or, if the line becomes crossed or shorted to ground in some manner, similar interruptions are caused in the pattern. If no relays are used and the lamp is connected directly to the line through one of the rings similar interruptions caused by similar defects will appear in the pattern. These interruptions appear as black bands of varying width in a lighted area traced by the revolving lamp. Thus the device may be used for indicating faults as well as for synchronizing.

From the above it can be seen that this device has three general functions, synchronizing and phasing, also trouble or fault-finding indications.

The method of rotating the brushes 9 and 10 has not been shown as any convenient mechanical or electrical device may be used, such as: a clock train driven by spring weights with governor, a steam engine with governor, a combustion engine, a direct current electric motor or an alternating current motor, a phonic wheel motor driven by vibrating reed, tuning fork or oscillating vacuum tube (radio tube) or any other prime mover.

The method used for obtaining synchronism and phase is not described as any of many well known methods are available.

We claim:

1. In a device for indicating the synchronic and phase relations between a pair of revolving members, the combination of a relay, means associated with one of said members to transmit current impulses of alternating polarity to the winding of said relay, an electric lamp of the glower type associated with the other revolving member, and means controlled by said relay and conductively connected to said lamp for alternately energizing and deenergizing said lamp, said means including a switch adapted to reverse the polarity of the current through said lamp.

2. In a device for indicating the synchronic and phase relations between a pair of revolving members, a combination of a relay, means associated with one of said members to transmit current impulses of alternating polarity to the winding of said relay, an electric lamp of the glower type carried by the other revolving member to revolve in a circular path, current supply means controlled by said relay and conductively connected to said lamp for alternately energizing and deenergizing the lamp and thereby producing alternate illuminated and dark segments in the path of said lamp, and means independent of said relay for reversing the direction of current flow through the lamp and thereby reversing the positions of the illuminated and dark segments in said path.

3. In a device for indicating the synchronic and phase relations of a pair of revolving members, the combination of a relay, a battery, conductive connections between the battery and the winding of the relay, said conductive connections including means embodying one revolving member for constantly alternating the polarity of the current flowing through the relay winding, an electric lamp associated with the other revolving member, and means controlled by said relay and conductively connected to the lamp for alternately energizing and deenergizing said lamp.

4. In a device for indicating the synchronic and phase relations of a pair of revolving members, the combination of a relay, a battery, conductive connections between the battery and the winding of the relay, said conductive connections including means embodying one revolving member for constantly alternating the polarity of the current flowing through the relay winding, an electric lamp of the glower type carried by the other revolving member to revolve in a circular path, and current supply means controlled by said relay and conductively connected to said lamp for alternately energizing and deenergizing the lamp and thereby producing alternate illuminated and dark segments in the path of said lamp.

5. In a device for indicating the synchronic and phase relations of a pair of revolving members, the combination of a relay, a battery, conductive connections between the battery and the winding of the relay, said conductive connections including means embodying one revolving member for constantly alternating the polarity of the current flowing through the relay winding, and means independent of said relay for reversing the direction of current flow through the lamp and thereby reversing the positions of the illuminated and dark segments in said path.

6. In a device for indicating the synchronic and phase relations of a pair of revolving members, the combination of a relay, a battery, conductive connections between the battery and the winding of the relay, said conductive connections including means embodying one revolving member for constantly alternating the polarity of the current flowing through the relay winding, a scanning disk associated with the other member and having a single opening adjacent its periphery, a tubular lamp of arcuate form arranged beneath the path of said opening, said lamp having an arcuate extent of substantially a full circle, and current supply means controlled by said relay and connected to said lamp for alternately energizing and deenergizing the lamp and thereby causing the slit to traverse alternate illuminated and dark segments of its path.

In testimony whereof we affix our signatures.

WILLIAM G. FLUHARTY.
PAUL A. NOXON.